No. 783,880. PATENTED FEB. 28, 1905.
J. F. MALCOM.
APPARATUS FOR HEATING AND PURIFYING OIL.
APPLICATION FILED MAR. 17, 1903.
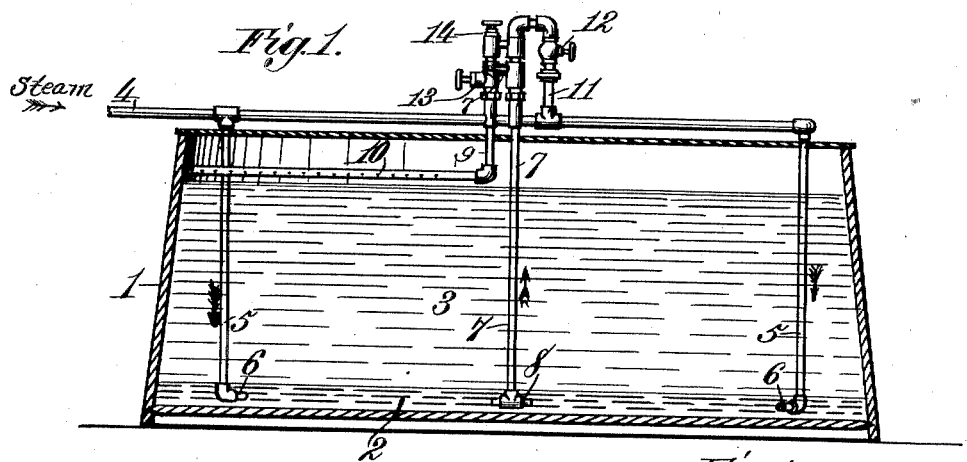
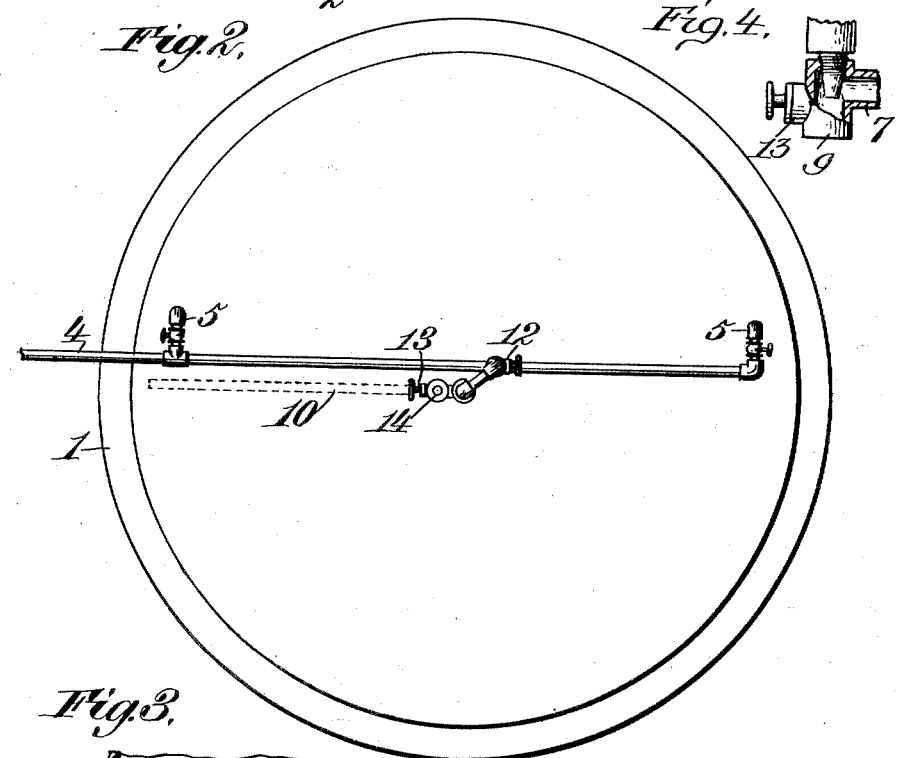
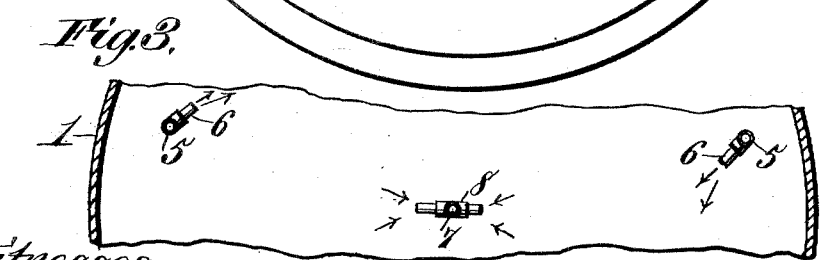
Witnesses.
Robert Everett.
James L. Norris, Jr.
Inventor:
James F. Malcom,
By James L. Norris,
Atty.

No. 783,880. Patented February 28, 1905.

UNITED STATES PATENT OFFICE.

JAMES F. MALCOM, OF BLUFFTON, INDIANA.

APPARATUS FOR HEATING AND PURIFYING OIL.

SPECIFICATION forming part of Letters Patent No. 783,880, dated February 28, 1905.

Application filed March 17, 1903. Serial No. 148,269.

*To all whom it may concern:*

Be it known that I, JAMES F. MALCOM, a citizen of the United States, residing at Bluffton, in the county of Wells and State of Indiana, have invented new and useful Improvements in Apparatus for Heating and Purifying Oil, of which the following is a specification.

This invention relates to an apparatus for heating and purifying oil.

The object of the invention is rapidly and effectively to heat and purify oil without causing it to evaporate or to be discolored through excessive application of heat. These objects are attained by the form of apparatus herein described and illustrated.

In oil regions crude petroleum and other oils when taken from the well are stored in large tanks or receptacles. This crude oil contains impurities in the form of sediment, which it is necessary to remove before shipment. In cold weather when it is desired to ship this petroleum it must be heated sufficiently to cause the sediment contained therein to settle to the bottom of the tank. This heating of the petroleum is generally effected by passing steam through coils of pipes laid in the bottom of the tank. According to this method, however, an excessive degree of heat is applied to the oil in the bottom of the tank, causing said oil to evaporate or to become discolored, while the oil at the top of the tank is either insufficiently heated to settle the sediment or else is heated so slowly as to cause the loss of much time and the expenditure of much heat during the heating operation.

My invention aims to provide means for uniformly heating the oil in the tank without, however, applying such a degree of heat as will cause the oil to evaporate or be discolored, thus avoiding the disadvantages above set forth.

I have illustrated a convenient embodiment of my invention in the accompanying drawings, forming a part of this specification, wherein—

Figure 1 is a central vertical section of my improved apparatus for heating and purifying oil. Fig. 2 is a plan view, and Fig. 3 is a section taken on the line 3 3 of Fig. 1. Fig. 4 is a fragmentary view showing the injector.

The numeral 1 indicates a tank to which crude oil is supplied in any desired manner. A stratum of water 2 is first placed in the bottom of the tank before the oil 3 is fed thereto. The stratum of water in the bottom of the tank is preferably about four inches in depth.

A steam-supply pipe 4, which is supplied with steam from any suitable source, is provided with a pair of branch pipes 5, extending downwardly into the tank 1. The lower end of each pipe 5 extends below the level of the water 2 in the tank 1 and is provided with a discharge-nozzle 6. In order that the water and oil in the tank 1 may be given a rotary motion, the two nozzles 6 are pointed in opposite directions, so that the passage of steam therethrough causes the water and oil to rotate.

At the central portion of the tank 1 is provided a suction-pipe 7, having at its lower end below the surface of the water in the tank 1 a T-shaped inlet 8. The suction-pipe 7 at its upper end is connected by a pipe 9 with a perforated discharge-pipe 10, which is located above the surface of the oil in the tank 1. A pipe 11 connects pipe 9 and discharge-pipe 10 with the steam-supply pipe 4. Valves 12, 13, and 14 are provided in the pipes 11 and 9 to control the passage of steam and water therethrough. The pipe 11, connected with the pipe 9, forms an inspirator or injector by means of which water drawn from the bottom of the tank 1 by the pipe 7 may be discharged through the pipe 10 upon the surface of the oil 3, as will be readily understood.

Any suitable valves or outlets (not shown) may be provided for withdrawing the oil and water from the tank.

Constructed as above described, the operation of my improved apparatus is as follows: The valves 12, 13, and 14 are opened to permit the injection or discharge of water and steam through the pipe 10. Steam is supplied through the pipes 5 and nozzles 6 to the water in the bottom of the tank, heating said water and causing it to rotate. The heat and rotation of the water 2 are communicated to the oil 3, located thereabove. By means of the suction-pipe 7 hot water is supplied to the perforated pipe 10, which discharges it onto the surface of the rotating body of the oil 3. The hot water discharged by the perforated pipe 10 onto the oil by reason of its greater specific gravity settles or sinks through the oil 3, heating said oil and causing the impurities contained therein to descend to the bottom of the tank. In this manner a constant circulation of hot water is maintained through the body of oil to be heated and purified.

By extending the steam-supply pipes 5 below the level of the water in the tank 1 the steam discharged by said pipes is prevented from directly mixing with the oil. It is found that if the steam is supplied directly to the oil the heat is so intense that it evaporates and discolors the oil. By my invention, therefore, I avoid the loss of oil caused by the evaporation and discolorization.

The efficiency of my improved apparatus is greatly increased by the particular arrangement of the steam-supply pipes 5 and the suction-pipe 7. In practice it is found that the jets of steam issuing from the nozzle 6 of the supply-pipes 5 cause the water in the lower portion of the tank to rotate with great rapidity. As all the sediment or heavy impurities which are separated from the body of oil superimposed upon the body of water settle into said body of water, the centrifugal action resulting from the rapid rotation of the water causes such sediment and heavy impurities to be impelled outward toward the periphery of the tank and practically renders the central portion of the body of water free from sediment or heavy impurities. For this reason the suction-pipe 7, which is located adjacent to the center of the tank, is prevented from sucking up and again discharging upon the surface of the oil any of the sediment or heavy impurities which have been precipitated or settle to the bottom of the tank.

In order to increase the rapidity with which the sediment or heavy impurities are separated from the body of oil under treatment and precipitated to the lower portion of the tank, I prefer to construct the tank with a wall which is flared outwardly toward its lower end, as shown clearly in Fig. 1 of the drawings. By reason of the rapid rotation of the oil and water, due to the powerful action of the steam-discharge pipes 5, any sediment or impurities contained in the oil are thrown outwardly by centrifugal force and impinge against the wall of the tank. Such sediment or impurities are then deflected toward the bottom of the tank by the outwardly-flared wall thereof, as will be apparent. Furthermore, by reason of the fact that the tank is constructed or made smaller at its upper end, as shown, any tendency of the oil contained therein to rise adjacent to the periphery of the tank and overflow therefrom due to centrifugal force is prevented. This tendency is also defeated by placing a suitable cover on the tank, as shown. Such cover not only prevents any overflow of oil from the tank, but it also prevents the escape of any heat which may be generated in the tank by the action of the steam, and thus facilitates the heating and purifying of the oil.

Having thus described the invention, what I claim as new, and desire to secure by Letters Patent, is—

1. An apparatus for heating and purifying oil, comprising an oil-tank to contain a body of liquid of greater specific gravity than oil in its lower portion, a plurality of steam-pipes terminating adjacent to the periphery of the tank and near its bottom, the ends of the pipes being pointed in such direction as to impart rotation to the liquid, and to cause any contained impurities to travel close to the walls of the tank, a suction-pipe extending coincident with the axis of rotation of the liquid, the suction end of the pipe being disposed adjacent to the lower portion of the tank and the discharge end thereof being perforated and extending horizontally from the axial center of the tank to a point near the periphery thereof.

2. An apparatus for heating and purifying oil, comprising an oil-tank to contain superposed bodies of water and oil, a plurality of steam-pipes terminating adjacent to the periphery of the tank adjacent to its bottom, the delivery end of the pipes being disposed in opposite directions and at an acute angle to the steam-pipes thus to cause rotation of the liquid in the tank and the forcing of any contained impurities in the oil from the center to the periphery of the tank, a suction-pipe extending coincident with the axis of rotation of the liquid, the suction end of the pipe being disposed adjacent to the bottom of the tank and the discharge end thereof being horizontally extended and perforated throughout its length.

In testimony whereof I have hereunto set my hand in presence of two subscribing witnesses.

JAMES F. MALCOM.

Witnesses:
  H. S. ROBINSON,
  R. D. ROBERTS.